United States Patent
Pop et al.

(10) Patent No.: US 12,351,111 B2
(45) Date of Patent: Jul. 8, 2025

(54) HOLDING ARRANGEMENT AND VEHICLE

(71) Applicant: Continental Automotive Technologies GmbH, Hannover (DE)

(72) Inventors: Laurentiu Pop, Timis (RO); Werner Zanzinger, Giroc (RO); Tobias Huth, Langenselbold (DE); Jörg Thomas, Dietzenbach (DE); Sergiu Rinja, Utvin (RO); Caius Ungureanu, Timisoara (RO); Marius Pascalau, Timisoara (RO)

(73) Assignee: Continental Automotive Technologies GmbH, Hannover (DE)

( * ) Notice: Subject to any disclaimer, the term of this patent is extended or adjusted under 35 U.S.C. 154(b) by 115 days.

(21) Appl. No.: 18/472,254

(22) Filed: Sep. 22, 2023

(65) Prior Publication Data
US 2024/0101044 A1   Mar. 28, 2024

(30) Foreign Application Priority Data
Sep. 22, 2022   (EP) .................... 22465553

(51) Int. Cl.
*B60K 35/50*   (2024.01)
*B60R 11/02*   (2006.01)
(Continued)

(52) U.S. Cl.
CPC .......... *B60R 11/0235* (2013.01); *B60K 35/00* (2013.01); *B60K 35/22* (2024.01);
(Continued)

(58) Field of Classification Search
CPC .............. B60K 2360/652; B60K 35/50; B60K 2360/816; B60R 11/0235
See application file for complete search history.

(56) References Cited

U.S. PATENT DOCUMENTS 5,067,747 A * 11/1991 Yokoyama ............. B62D 1/192
296/70
6,149,196 A   11/2000 Guiard et al.
(Continued)

FOREIGN PATENT DOCUMENTS

DE   102016004156 A1   9/2016
DE   102018110548 A1   11/2019
(Continued)

OTHER PUBLICATIONS

Office Action dispatched May 14, 2024 from corresponding Japanese patent application No. 2023-153884.
(Continued)

*Primary Examiner* — Bradley Duckworth

(57) ABSTRACT

A pivotable display system having a traction spring tensioned to reversibly pivot the display around a pivot axis of a shaft connected to an upper portion of a display in a direction from a front side of the display toward the rear side of the display. In the event of an accident-related application of force below a threshold, the display is rotatable in a rearward direction toward an instrument panel, so that a steering column pushed in a direction towards the display avoids or at least reduces the risk of destruction of the display. In the event of accident-related application of force above the threshold, the traction spring may reversibly displace the display upwardly away from the steering column.

5 Claims, 4 Drawing Sheets

(51) Int. Cl.
  *B60K 35/00*    (2006.01)
  *B60K 35/22*    (2024.01)
  *B60K 35/53*    (2024.01)
  *B60R 11/00*    (2006.01)

(52) U.S. Cl.
  CPC .............. *B60K 35/50* (2024.01); *B60K 35/53* (2024.01); *B60K 2360/816* (2024.01); *B60R 2011/001* (2013.01); *B60R 2011/0066* (2013.01)

(56) References Cited

U.S. PATENT DOCUMENTS

| | | | | |
|---|---|---|---|---|
| 11,377,043 | B2* | 7/2022 | Kato | B60R 11/0229 |
| 12,134,355 | B2* | 11/2024 | Viswaraj | B60K 35/50 |
| 2012/0063081 | A1* | 3/2012 | Grunwald | B60R 11/0235 |
| | | | | 361/679.41 |
| 2023/0373303 | A1* | 11/2023 | Koch | B60K 35/50 |

FOREIGN PATENT DOCUMENTS

| | | |
|---|---|---|
| DE | 102020112132 B3 | 3/2021 |
| DE | 102021003151 A1 | 8/2021 |
| EP | 3145797 A1 | 3/2017 |
| EP | 3845435 A1 | 7/2021 |
| FR | 2781189 A1 | 1/2000 |
| JP | 2022123459 A | 8/2022 |
| WO | 2020008237 A1 | 1/2020 |

OTHER PUBLICATIONS

European Search Report dated Feb. 8, 2023 for the counterpart European Patent Application 22465553.0.

* cited by examiner

HOLDING ARRANGEMENT AND VEHICLE

CROSS-REFERENCE TO RELATED APPLICATIONS

The present application claims priority from European Patent Application No. 22465553.0 filed on Sep. 22, 2022, the content of which is herein incorporated by reference.

BACKGROUND

1. Field

Embodiments of the present application relate to a holding arrangement comprising an instrument panel and display means, wherein the holding arrangement is connected to the instrument panel, the holding arrangement having a support device arranged above a steering column. Furthermore, embodiments of the present application relate to a vehicle with such a holding arrangement.

2. Description of Related Art

Lately, larger display and control units—displays—are being increasingly installed in motor vehicles. These are panel-shaped displays. In many cases, they are located as a central display around the middle of the dashboard. These displays face the passenger compartment of a vehicle so that the driver and front passenger can see the information on them.

Recent developments in the area of display and control units—displays in motor vehicles are moving towards the use of free-standing displays instead of classic displays.

Such displays are arranged above a steering column of the motor vehicle. In the event of a crash, it must usually be possible to ensure that the steering column can be pushed forward in order to prevent the display from shattering. In the event of an accident, the steering column retracts to protect the driver against a strong impact with the steering wheel. The steering column during the retraction may hit the display and this is not desirable as the driver may be injured.

In the event of an accident, if the steering column fails to retract to its final position, the driver may be injured by the steering wheel or by the broken parts. Also, the functionality of the steering wheel airbag will be affected. When the steering column retracts, the display will be struck causing the following problems: First, the steering column will stop retracting.

Second, also the display glass may break, and the resulting particles fall into the drivers area.

DE 10 2016 004 156 A1 discloses a holding arrangement a display device for a motor vehicle interior, in which the display device by means of a holding device in a region in the vehicle vertical direction above a steering column, wherein the display device in an accidental application of force due to a displacement of the steering column of the holding device in the region of respective retaining elements is selectively solvable.

DE 10 2020112132 B3 discloses an assembly for a vehicle comprising a cross member, provided for connection to two pillars opposite one another with respect to the xz plane of the vehicle, a bracket connected to the cross member and protruding from it in the radial direction with terminal connection means and a panel-shaped instrument connected to the connection means of the holder at a distance from its upper end, which is in this way is held that its user interface points in the x-direction into the passenger compartment of the vehicle, wherein the holder as a supporting structure holder formed from a hollow chamber profile with an upper belt and a lower Belt is executed, which two belts are connected to one another by a framework and are arranged inclined to one another, so that these one instrument connection side have a greater distance from one another than at their end facing the cross member, and that at least one of the two belts between its two connection points has at least one predetermined kink provided by its geometry, at which this belt buckles in the z-direction.

SUMMARY

Objects and aspects of embodiments of the present application provide a safer and improved holding arrangement in the event of a crash. Objects and aspects of embodiments of the present application also provide a vehicle with such a holding arrangement.

According to an aspect of an embodiment, there is provided a holding arrangement comprising an instrument panel and display means, wherein the holding arrangement is connected to the instrument panel, the holding arrangement having a support device arranged above a steering column, wherein at least one hook, which is arranged open towards the steering column, is attached to the display means and wherein the support device has a bearing element which is partly arranged in the hook to form a connection with the display means, so that the bearing element can be pivoted about a pivot axis together with the display means, wherein the bearing element is connected also to the instrument panel, and wherein the display means is detachable connected with the bearing element, and wherein, in the event of an accident-related application of force below the threshold value, the bearing element together with the display means is initially rotatable in the direction of the instrument panel about the pivot axis to form a housing, so that the steering column, which is pushed in the direction of the display means, is movable in the housing, in order to avoid or at least reduce the risk of destruction of the display means.

In particular, the bearing element are rotatably arranged in the hook, by this the display means can also rotating towards the instrument panel.

According to an aspect of an embodiment, the holding arrangement is configured to house the steering column in case of an accident.

The holding arrangement avoids or at least reduces the risk of destruction of the display unit. This reduces the risk of breaking parts, which can injure the driver e.g. by glass, plastic part etc. Furthermore, the driver is protected during the accident.

Also, the steering wheel airbag is activated correctly. Moreover, the style of the displays can be made closer to the steering column, that means without large gaps, as now in many cars.

This enables a more compact design than in the state of the art.

Objects and aspects of the embodiments of the present application can be applied in all vehicles etc which have such a display and a steering column.

In one embodiment a pivot element is provided, wherein the bearing element is connected at the end to the pivot element and wherein the display means and the bearing element are arranged pivotably at the instrument panel via the pivot element to form a housing for a first displacement of the steering column.

The pivot element can be a shaft. The bearing element can be pivotally attached to the pivot element or the shaft itself can be rotated, so that the display means can be moved to form the housing for the steering column.

Alternatively, the pivoting element, in this case e.g. the shaft itself, can be pivotally attached to the instrument panel.

In a further embodiment, the pivot element is configured to be arranged largely horizontal.

Furthermore, the bearing element can be arranged in the hook in such a way that, up to the threshold value, pivoting of the bottom of the display means, which faces the steering column, towards the instrument panel is ensured.

In a further embodiment, the pivot element can be designed as a shaft, which can be pivotably attached to the instrument panel or in which the bearing element is pivotably hooked.

This enables a simple reversible pivoting of the display means. The pivoting process is reversible over a small angle up to the threshold value. This enables minor accidents with a steering column displacement without irreversible damage to the display means.

In a further embodiment, the display means and the support device have corresponding cutouts for fastening the support device to the display means by means of at least one screw connection. This enables the support device to be securely fastened to the display means.

In a further embodiment, the support device has a predetermined breaking point which breaks when an accidental force is applied above the threshold value, so that a second displacement of the steering column greater than the first displacement is possible. In particular, the predetermined breaking point is located at the screw connection.

This allows the display means to be moved reversibly before being released from the support device. The predetermined breaking point reduces the release forces in the event of a crash.

By breaking the predetermined breaking point, the display means is detached from the support device and the display means moves in the same direction as the steering column moves along during the crash, thus freeing more housing for the steering column. By detaching the display means from the support device, more housing is created for the steering column, so that destruction of the display means by the steering column can be avoided.

In a further embodiment, at least one extending traction spring is arranged vertically at the display means. Vertical corresponds to a tensile force directed away from the steering column.

In a further embodiment, the at least one traction spring is preloaded during normal driving operation, and wherein the traction spring relaxes upon application of force above the threshold due to a broken predetermined breaking point, thereby lifting the hook of the display means beyond the bearing element, allowing the display means to be detached from the support device.

When the traction spring is released, the display means is pushed in the direction in which the steering column moves in an event of a crash. By releasing the traction spring in this way, the display means can be quickly detached from the support device.

Furthermore, two preloaded traction springs can preferably be provided, which are arranged symmetrically in the center of the support device.

In a further embodiment, the screw connection and the predetermined breaking point are arranged in an area vertically below the at least one traction spring.

This allows the display means to be quickly detached from the support device in the event of a breakage of the predetermined breaking point.

In a further embodiment, at least two hooks are provided, which are arranged symmetrically around a central axis of the display means. This ensures secure fastening of the display means to the support device.

In a further embodiment, the display means is designed as an instrument cluster or electronic visual display.

Furthermore, the object is solved by a vehicle with a holding arrangement as described above. In particular, such an instrument cluster or electronic visual display is arranged in the cockpit. Furthermore, this holding arrangement can also be used wherever a steering column is used.

BRIEF DESCRIPTION OF THE DRAWINGS

In the following the embodiments will be explained in more detail with reference to the drawings, in which.

DETAILED DESCRIPTION

Figure 1:
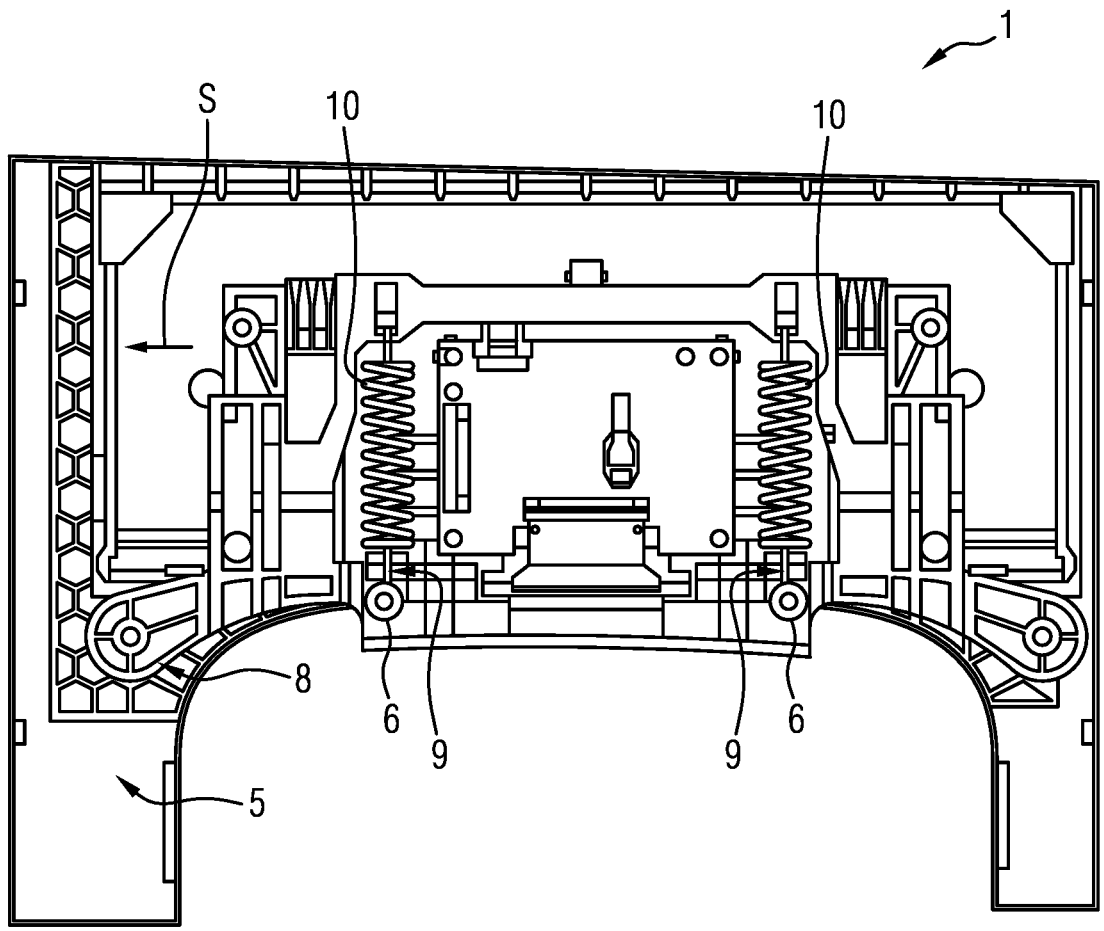
FIG. 1 is a diagram illustrating a holding arrangement, according to an embodiment.

FIG. 1 shows a holding arrangement 1 schematically.

The holding arrangement 1 is arranged above a steering system in a frame 3. The holding arrangement 1 carries a display means, which is designed here as a display 4. The display 4 can be arranged facing the driver. Furthermore, the display 4 has a front side facing the driver and a rear side 5 opposite the front side.

The steering system comprises a steering column 7 on which a steering wheel is arranged facing the driver.

Furthermore, the holding arrangement 1 has a support device 8 and an instrument panel 2.

This support device 8 is attached to the instrument panel 2. The support device 8 extends essentially parallel between the instrument panel 2 and the display 4.

Furthermore, the support device 8 is attached to the display 4 with two screw connections 6. For this purpose, the rear side 5 of the display 4 has corresponding cutouts, for example threaded holes.

Figure 2:
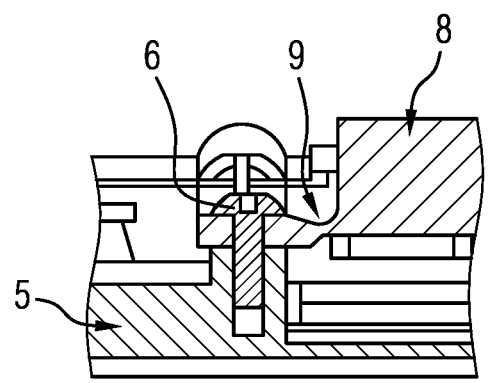
FIG. 2 is a diagram illustrating a screw connection, according to an embodiment.

FIG. 2 shows the screw connection 6 in detail. This screw connection 6 can consist of a simple screw and a corresponding cutout in the rear side 5 of the display 4.

A predetermined breaking point 9 is arranged in the support device 8 next to the screw connection 6.

Furthermore, two preloaded traction springs 10 are provided, which are symmetrically arranged in the center of the support device 8.

Figure 3:
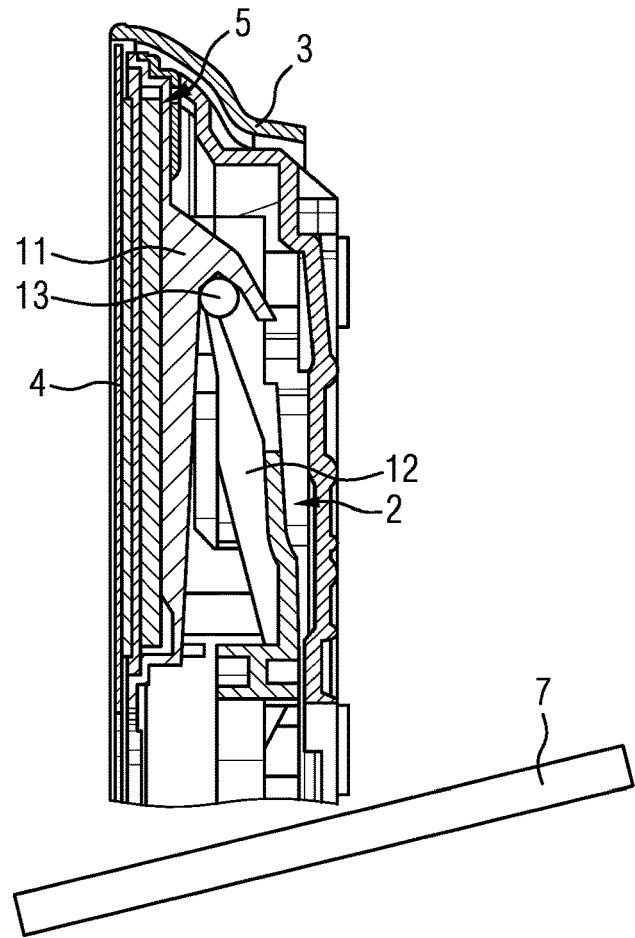
FIG. 3 is a diagram illustrating a holding arrangement, according to an embodiment.

FIG. 3 shows a holding arrangement 1 in normal operation.

In this embodiment, the holding arrangement 1 has two hooks 11 which are arranged open towards the steering column 7 and a bearing element 12 that can be pivoted about a pivot axis S as well as a pivotable display 4.

Furthermore, a pivot element is provided, which can be designed as a shaft 13 and in which the bearing element 12 is pivotably attached or which is itself pivotably attached to the instrument panel 2.

Figure 4:
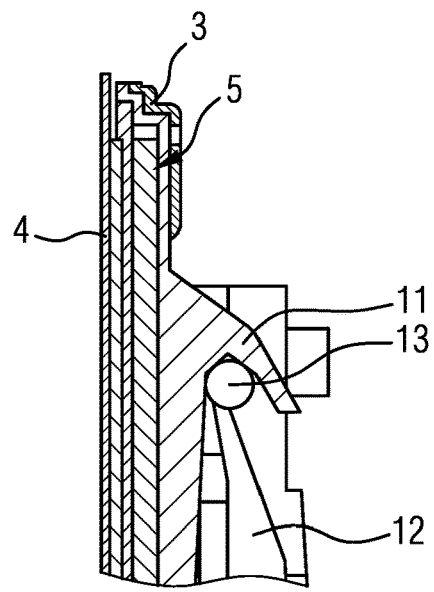
FIG. 4 is a diagram illustrating a non-pivoted bearing element and non-pivoted display, according to an embodiment.

FIG. 4 shows the non-pivoted bearing element 12 and non-pivoted display 4 in detail.

The bearing element 12 is connected to the instrument panel 2, for example, by the shaft 13, which is attached to the instrument panel 2, and further attached to the display 4 by the hook 11.

The traction springs 10 are preloaded during normal operation; the predetermined breaking point 9 is not broken.

Figure 5:
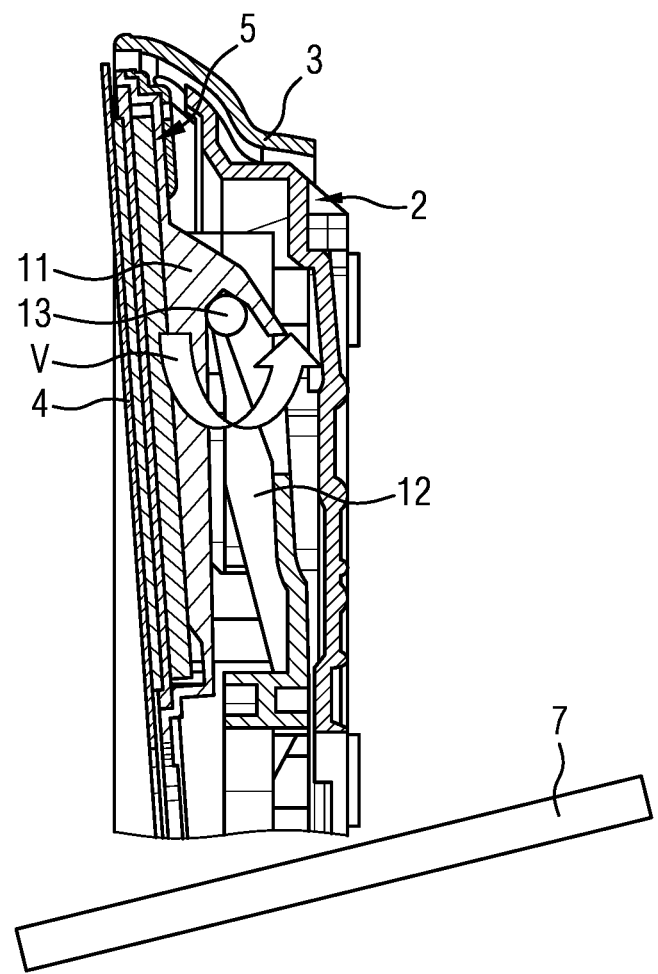
FIG. 5 is a diagram illustrating a holding arrangement in a crash with an accidental force application below the threshold value, according to an embodiment.

FIG. 5 shows the holding arrangement 1 schematically in a crash with an accidental force application below the threshold value.

In the event of an accident-related force application below a threshold value, the bearing element 12 is first rotated in the direction of instrument panel 2 about the pivot axis S to form a housing S (pivoting V) in such a way that the steering column 7 can be moved into the housing when pushed in the direction of display 4.

This is a reversible pivoting V to avoid or at least reduce the risk of destruction of the display 4.

The traction springs 10 are preloaded during a crash with an accidental force application below the threshold value; the predetermined breaking point 9 is not broken.

Figure 6:
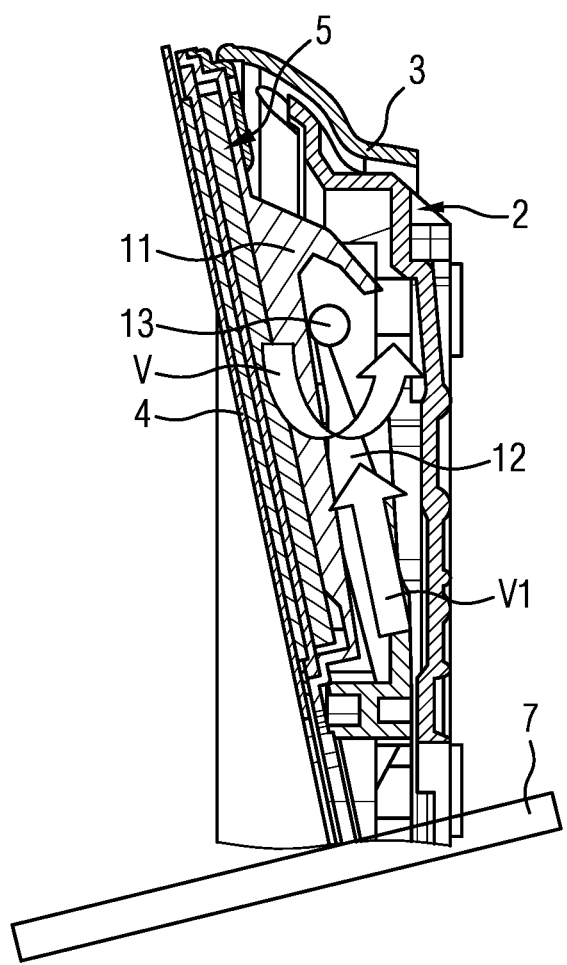
FIG. 6 is a diagram illustrating a holding arrangement schematically in a crash with an accidental force application above the threshold value, according to an embodiment.

FIG. 6 shows the holding arrangement 1 schematically in a crash with an accidental force application above the threshold value.

In case of a crash above the threshold value, the breaking point 9 breaks. This releases the traction springs 10 and the display 4 is detached from the support device 8 by pushing the hooks 11 of the display 4 beyond the bearing element 12. This allows the display 4 to be detached from the instrument panel 2.

This creates more housing for the steering column 7 (displacement V1).

So when the collision happens, the steering column 7 will move along it's axis until it touches a trigger integrated in the instrument panel 2. The force of the steering column 7 will therefore rotate the instrument panel 2 in hooks 11 until the carrier predeterminate breaking feature (breaking point 9) will break and release the instrument panel 2. The traction springs 10 are activated when the breaking point 9 breaks. The steering column 7 will not stop until its final position and the driver is protected.

This first allows reversible displacement of the display and then detachment from the holding device 8.

By breaking the predetermined breaking point 7, the display 4 is detached from the support device 8 and the display 4 moves in the same direction as the steering column 7 moves during the crash, thus releasing more housing for the steering column 7.

Detaching the display 4 from the support device 8 thus creates more housing for the steering column 7, so that destruction of the display 4 by the steering column 7 can be avoided.

By the holding arrangement 1 according to the application the driver is protected during the accident. Furthermore, the steering wheel airbag is activated correctly. Also, by the holding arrangement 1 according to the application the risk of breaking parts, which can injure the driver (glass, plastic parts) is reduces. The style of the display 4 can be made closer to the steering column 7, e.g. without large gaps.

The invention claimed is:

1. A pivotable display system comprising:
   a display, the display comprising:
      a cutout disposed on a rear side of the display; and
      an attachment hook having an opening, the opening of the attachment hook disposed in a substantially vertical orientation of the pivotable display system; and
   a support device coupled to the display, the support device comprising:
      a threaded hole aligned with the cutout, the threaded hole configured to receive a screw;
      the screw disposed in the threaded hole, the screw coupling the support device to the display;
      a shaft disposed in a horizontal orientation of the pivotable display system, the opening of the attachment hook disposed on the shaft; and
      a traction spring tensioned to reversibly pivot the display around a pivot axis of the shaft in a direction from a front side of the display toward the rear side of the display.

2. The pivotable display system of claim 1, wherein the screw couples the support device to a bottom portion of the display.

3. The pivotable display system of claim 2, wherein the attachment hook couples a top portion of the display to the shaft.

4. The pivotable display system of claim 3, wherein the support device further comprises a breaking part disposed adjacent to the threaded hole.

5. The pivotable display system of claim 4, wherein the traction spring is tensioned to detach the attachment hook from the shaft in the substantially vertical orientation and reversibly displace the display in the substantially vertical direction in response to breakage of the breaking part.

* * * * *